Patented Nov. 12, 1940

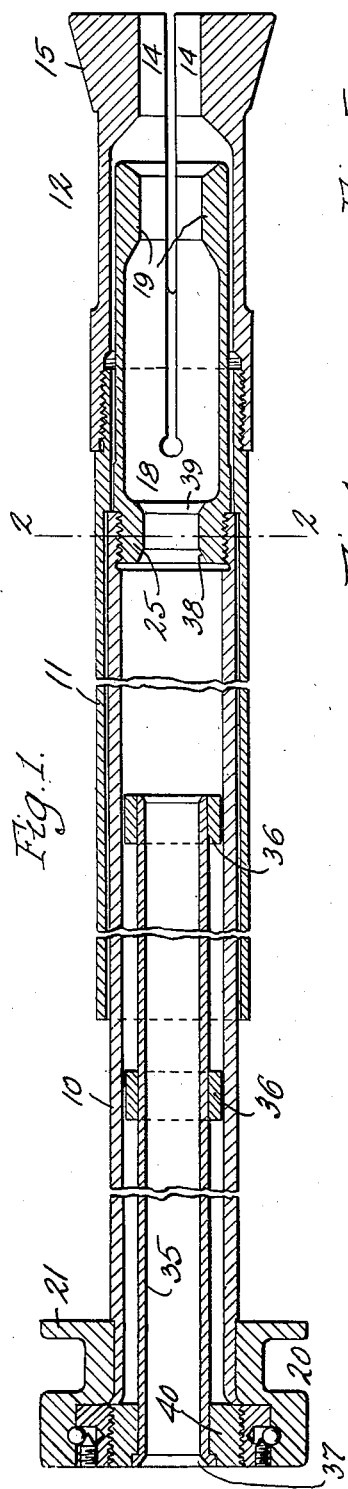

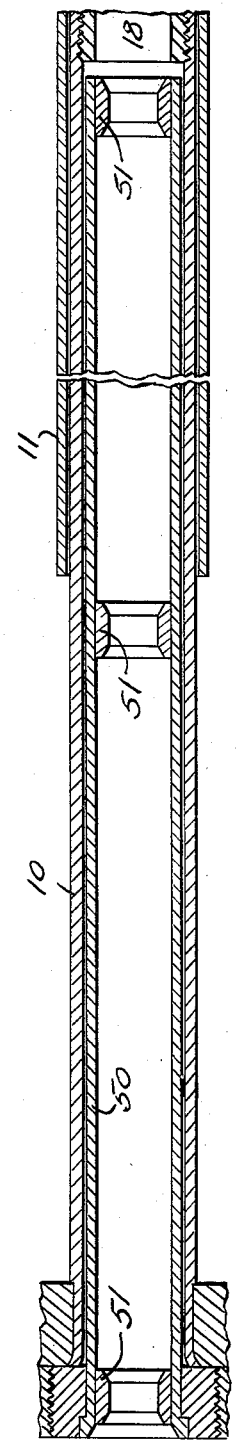

2,221,734

UNITED STATES PATENT OFFICE 2,221,734

MEANS FOR FEEDING WORK IN AUTOMATIC SCREW MACHINES

Leigh R. Evans, Elmira, N. Y., assignor to Hardinge Brothers, Inc., Elmira, N. Y.

Application January 5, 1938, Serial No. 183,511

12 Claims. (Cl. 29—62)

This invention relates to means for use in connection with the feeding of work into proper relation to the cutting tools of automatic screw machines when operating at high speeds.

There has been a tendency recently to greatly increase the speed of rotation of automatic screw machines, and it has been found that when speeds in excess of 4000 revolutions per minute are employed, the action of the usual feed chuck in an automatic screw machine cannot be relied upon to accurately feed the work.

It is one of the objects of this invention to provide means of improved construction for enabling the feed chuck of an automatic screw machine to properly feed work in machines of this kind operated at speeds in excess of 4000 revolutions per minute. A further object is to provide means for confining the work during the feeding operation of the feed chuck against movement radially or laterally of the length of the work in excess of .015 of an inch. Another object is to provide a feed chuck provided with means for closely confining the work with relation to the feed chuck to enable the feed chuck to correctly advance the work between cutting operations.

Other objects of this invention will be apparent from the following description and claims.

In the accompanying drawings:

Fig. 1 is a fragmentary longitudinal central sectional view of a part of the rotary work receiving sleeve of an automatic screw machine, and provided with means whereby my method may be carried out.

Fig. 2 is a transverse section thereof, on line 2—2, Fig. 1.

Fig. 3 is a section similar to that shown in Fig. 2, of a slightly modified construction adapted for use in feeding hexagonal stock.

Figs. 4 and 5 are fragmentary longitudinal sectional views of portions of rotary sleeve assemblies of slightly modified constructions.

Figs. 6 and 7 are fragmentary longitudinal central sectional views of still other modified forms of the rotary sleeve assemblies.

Referring to Fig. 1, 10 and 11 represent two tubular members, one of which telescopes into the other and both of these members are rotated about their common axis in any suitable manner (not shown) and comprise a part of the rotary work holding and advancing assembly of an automatic screw machine. The tubular member or sleeve 11 has a threaded end adapted to receive a work holding chuck or collet 12 including two or more spring fingers provided at their outer ends with work gripping jaws or parts 14. The collet is provided near its outer end with an outer taping or substantially frusto-conical surface 15 with which a rotary part of the automatic screw machine may engage to force the work gripping jaws 14 into holding engagement with the work against the spring tension of the fingers which urges the gripping jaws 14 away from the work. The collet 12 is removable from the sleeve or tubular member 11 so that it may be replaced by another collet when worn out or by collets having work engaging jaws 14 adapted to grip work of different sizes or shapes.

The other sleeve 10 has a feed chuck 18 also removably secured to the end thereof. This feed chuck includes the usual resilient fingers provided at their ends with work gripping jaws 19. The resilient fingers of the feed chuck are so formed that they are urged toward each other into work engaging positions by their own spring tension. Rotary motion is imparted to the work or rod stock by the continuous engagement of the work by the feed chuck and by the engagement of the work by the collet during cutting operations.

The sleeve 10 and feed chuck 18 together constitute a work advancing or feeding unit which is movable lengthwise relatively to the sleeve 11 for advancing the work. As is well known in the operation of automatic screw machines, the sleeve 10 and the feed chuck 18 carried thereby are moved to the left from the position shown in Fig. 1, while the jaws of the collet 12 are in gripping engagement with the work. When the work is to be advanced, the pressure on the jaws 14 of the collet is released so that these jaws disengage the work, and sleeve 10, which carries the feed chuck, is then moved to the right in Fig. 1 to the desired extent, depending upon the extent to which the work is to be fed. The work will, consequently, be moved to the right by the jaws of the feed chuck 18 which resiliently grip the same, whereupon the jaws of the collet will again be forced into engagement with the work so that the same is rigidly held while rotating and while operated upon by the cutting tools (not shown). While the work is being held by the jaws of the collet, the feed chuck and sleeve 10 are again moved to the left in Fig. 1 in readiness to again advance the work. The longitudinal movement of the work advancing or feeding unit may be effected in any suitable manner, for example, by some part (not shown) engaging in an annular groove 20 formed in a collar 21 suitably secured to the sleeve 10. All of these parts have heretofore been used in connection with the advancing and holding of work in automatic screw machines operating at speeds materially less than 4000 revolutions per minute and of themselves are not a part of this invention.

It has been found that the conventional type of work feeding mechanisms above described does not operate successfully at speeds in excess of about 4000 to 5000 revolutions per minute, depending upon the nature of the work. At these higher speeds, the work is not uniformly fed and the mechanism is not accurate in feeding the work to the required distance. It is, of course, obvious that when the work or rod is not advanced to the extent necessary to provide the proper length of material for the cutting tools to work upon, defective work will be produced. It was also found that the higher the speed, the more unreliable the feeding mechanism becomes. It was first thought that centrifugal action on the spring fingers might be responsible for the failure of the feed chuck to advance the work, but operating with feed chucks having spring fingers with greatly increased spring tension failed to remedy the difficulty, which showed clearly that the action of centrifugal force on the spring fingers was not responsible for failure of the feed chucks to properly feed the work.

I have found that the failure of the feed chuck to advance the work at high speeds can be remedied by confining the portion of the work extending into the feed chuck within narrow limits against a vibratory or radial movement out of its correct position concentric with the axis of rotation of the feed chuck and the rotary sleeves of the screw machine. Consequently, in carrying out my improved method, I preferably confine the rapidly revolving work adjacent to the point of entry into the feed chuck in such a manner that the work is free to move lengthwise of the feed chuck, but is prevented from moving or vibrating radially or in a crosswise direction with reference to its length in excess of .015 of an inch, and preferably crosswise movement in excess of .005 of an inch is prevented. Preferably this is accomplished by confining the work so that the part of the work within the feed chuck is prevented from moving out of its true concentric position with reference to the feed chuck and tubular sleeve 10 to a distance more than about .0075 of an inch, preferably about .0025 of an inch. By thus holding the work or bar against excessive vibrational or radial movement or in close proximity to its concentric position with reference to the axis of rotation of the feed finger, correct and accurate feeding of the work results, even at speeds as high as 9000 revolutions per minute and higher.

My invention may be carried out by various means. For example, in Fig. 1, I have provided, by way of example, in the cylindrical or unslotted portion of the feed finger 18 an inwardly extending bushing 25 formed integrally with the feed finger, and the internal diameter of this bushing in order to carry out my method, must be not more than about .015 of an inch greater than the outside diameter of the work which is being fed. If desired, the inside diameter of the bushing 25 may be only about .005 of an inch greater than the outside diameter of the work to be fed, and in case stock of small diameter rotated at very high speeds, even less clearance between the stock and the bushing is desirable.

The bushing on the feed chuck may be made in a separate piece, if desired, and in Fig. 4, I have shown a bushing 27 which is suitably secured to the inner wall of a feed chuck 28, as by welding, by a shrink fit, or other suitable means, and in Fig. 5, I have shown a bushing 29, which is arranged within the sleeve or tubular member 10 adjacent to the work receiving end of the feed chuck 30. This bushing 29 may, for example, be held in place in a portion of slightly larger internal diameter of the sleeve 10 terminating in a shoulder 31, against which the bushing 29 will be pressed when the feed chuck 30 is secured to the sleeve 10. In the case of the bushings 27 and 29, the inside diameters of the bushing must be not more than .015 of an inch greater than the outside diameter of the work to be operated upon. In Fig. 3, I have shown a construction similar to that shown in Figs. 1 and 2, except that a bushing 33 is provided having a hexagonal opening therein for use in connection with the feeding of hexagonal bars. It will, of course, be understood that the bore or opening in the collar may be of any suitable form or shape to conform to the shape of the bars which are being fed.

In order to further hold the work in correct relation to the feed chuck, additional work confining means may be provided in the sleeve 10, or if desired, these work confining means may be used in place of the bushings described. In the construction shown in Fig. 1, I have provided an elongated guide sleeve or tube 35 in the sleeve 10, the bar receiving end of which may be secured to the shifter collar 21 in any suitable manner.

This guide sleeve may be supported concentrically in the sleeve 10 in any suitable manner, for example, the guide sleeve may be provided at intervals on its outer surface with enlarged portions in the form of collars or rings 36 secured to the guide sleeve 35 and extending into close proximity with the inner surface of the revolving feed chuck supporting sleeve 10 of the screw machine. Preferably the inner end of the guide sleeve 35 extends near enough to the work confining bushing arranged near the feed chuck, such for example as the bushings 25, 27 and 29, so that the work when passed through the guide sleeve 35 will be centered so as to pass into the work confining bushing. The guide sleeve 35 also holds the part of the work or bar further removed from the feed chuck in substantially concentric relation to the axis of rotation and thus reduces vibrational or radial movement of the part of the bar gripped by the feed chuck. Preferably the inlet end of the guide sleeve is beveled as indicated at 37 to help in guiding the work into the guide sleeve and the bushings 25, 27 and 29 may also be provided with beveled or frusto-conical faces 38 and 39 arranged at opposite ends thereof, which help to guide the bars into the openings of these bushings, the beveled faces 39 guiding the bars into the bushings when moved in the reverse direction. The guide sleeve 35 may be secured at its work-receiving end to an outwardly extending flange or part 40 which is removably secured to the shifting collar 21. This arrangement permits the guide sleeve 35 to be removed from the collar 21 and to be replaced by guide sleeves of other dimensions and internal cross sectional shapes to cooperate with bars of different shapes and sizes on which the screw machine may operate. The internal diameter of the guide sleeve should also be not more than .015 of an inch greater than the external diameter of the work, if the guide sleeve is used to supplement a bushing in or near the feed chuck. If the guide sleeve is used without a bushing in or near the feed chuck, the inside diameter of the guide sleeve is preferably only about .002 to .005 of an inch greater than the outside diameter of the work.

In Fig. 6 is shown a modified form of guide sleeve for the work. In this figure, a guide sleeve 45 is provided with integrally outwardly extending annular portions 46 adapted to engage the inner surface of the sleeve 10 of the screw machine. Guide sleeves of other constructions may, of course, be provided, if desired. In addition to guiding the bars into correct relation to the work confining bushings, the guide sleeves also serve to confine a portion of the stock located at a distance from the feed chuck more nearly in axial relation to the revolving parts of the screw machine and prevent vibration of the part of the work near the feed chuck, and thus also help to ensure proper feeding of the stock.

In Fig. 7 is shown a construction in which a guide sleeve 50 is employed which is of materially greater internal diameter than the stock and which is provided with one or more bushings 51, three being shown in the construction illustrated, which have internal diameters not more than .015 of an inch greater than the work. In this case, the guide sleeve 50 is made of sufficient length to extend into close proximity to a feed chuck 18 and one of the bushings 51 is arranged at the end of the guide sleeve nearest to the feed chuck. In this form a feed chuck of ordinary construction may be employed, not having a work confining bushing at the work receiving end thereof, since the end bushing in the guide sleeve takes the place of a bushing in the feed chuck. This guide sleeve holds the work against vibration or radial movement such as would interfere with the operation of the feed chuck.

It will, of course, be understood that the bushings shown in conjunction with the feed chucks, such as the bushings 25, 27, and 29 may be used without guide sleeves, and also the guide sleeves may be used without the bushings. If necessary because of the nature of the work, both bushings and guide sleeves may be used simultaneously to hold the work.

While I am not certain as to the cause of failure of ordinary feed chucks as heretofore made to operate satisfactorily at speeds in excess of 4000 R. P. M., yet it is my belief that this failure is probably due to the fact that at high speeds, the bar or work if not confined may vibrate or move crosswise or radially of its length at such high speeds that the spring pressed gripping fingers of the feed chuck do not follow the radial or crosswise movements of the bar with sufficient speed to continuously grip the work with spring pressure. By confining the portion of the bar adjacent to the gripping parts of the fingers of the feed chuck, such movement of the portion of the bar extending within the feed chuck is prevented, and consequently, the gripping fingers of the feed chuck will engage the work with sufficient spring pressure to insure a correct feeding of the same at all times.

I have also found that the herein described means for feeding work in automatic screw machines, by confining the work against radial movement at the gripping portions of the feed chuck, also prevents the feed fingers from scratching the stock. This is of particular importance when the stock which is being operated upon has a polished exterior surface.

I am aware of the fact that a patent has been issued to James R. O'Connell No. 1,701,213 in which a centering sleeve is provided for use in connection with a feed chuck. This centering sleeve was provided with an inside diameter materially larger than that provided between the gripping jaws of the feed chuck and was intended merely to guide the work somewhere near centrally of the chuck. At the time that this patent was issued, speeds in excess of 4000 revolutions per minute were not used on screw machines, and furthermore, my work retaining means to be effective must have internal diameters not more than .015 of an inch greater in diameter than the outside diameter of the work in order to enable the feed chuck to properly feed the work.

The word "radial" as herein used, is intended to include any movement of the work other than the longitudinal movement of the same.

I claim as my invention:

1. The combination with a work advancing unit of an automatic screw machine including a rotary sleeve into which the work extends and a feed chuck secured to said sleeve and having spring fingers with work engaging jaws resiliently urged into engagement with the work, by said spring fingers, of work confining means arranged in said unit adjacent to said jaws and extending into close proximity to the outer surface of the work and providing a clearance between said confining means and the work of not more than .015 of an inch to prevent the excessive radial movement of the work with reference to its axis during advancing of the work by said unit.

2. The combination with a work advancing unit of an automatic screw machine including a rotary sleeve into which the work extends and a feed chuck secured to said sleeve and having spring fingers with work engaging jaws resiliently urged into engagement with the work, of rigid work engaging means arranged in said unit and having a slidable engagement with the work to permit the work and said unit to move lengthwise relatively to each other, said work engaging means confining the portion of the work engaged by said jaws against movement transversely of its length in excess of .015 of an inch.

3. The combination with a work advancing unit of an automatic screw machine including a rotary sleeve into which the work extends and a feed chuck secured to said sleeve and having spring fingers with work engaging jaws resiliently urged into engagement with the work, of a rigid work engaging bushing arranged within said unit in immediate proximity to said feed chuck and through which the work may pass, said bushing having an internal diameter which is greater than the external diameter of the work to be fed by not more than .015 of an inch.

4. A feed chuck for an automatic screw machine having a cylindrical portion at one end thereof and resilient fingers extending from said cylindrical portion and having work engaging jaws at the opposite end of said chuck adapted to be yieldingly pressed against the work by said fingers, said feed chuck having a work engaging bushing in said cylindrical portion, said bushing having an aperture which is not more than .015 of an inch greater than the external dimension of the work to be fed.

5. A feed chuck according to claim 4 characterized in that the aperture of said bushing is only about .005 of an inch greater than the outside dimension of the work.

6. The combination with a work advancing unit of an automatic screw machine including a rotary sleeve into which the work extends and a feed chuck secured to said sleeve and having spring fingers with work engaging jaws resiliently urged into engagement with the work, by said spring fingers, of a work confining bushing removably arranged in said rotary sleeve and engaging the work immediately in advance of said chuck, said bushing having an internal diameter not exceeding .015 of an inch greater than the external diameter of the work to permit said work to move lengthwise through said bushing and to confine the work against radial movement in excess of .015 of an inch.

7. The combination with a work advancing unit of an automatic screw machine including a rotary sleeve into which the work extends and a feed chuck secured to said sleeve and having spring fingers with work engaging jaws resiliently urged into engagement with the work, by said spring fingers, of a work confining guide sleeve arranged in said feed chuck supporting sleeve immediately in advance of said feed chuck and having an internal diameter not more than .015 of an inch greater than the outside diameter of the work and through which the work passes to said feed chuck.

8. The combination with a work advancing unit of an automatic screw machine including a rotary sleeve into which the work extends and a feed chuck secured to said sleeve and having spring fingers with work engaging jaws resiliently urged into engagement with the work, by said spring fingers, of a work confining guide sleeve arranged in said feed chuck supporting sleeve in advance of said feed chuck and having an end thereof extending into proximity to said feed chuck, and a bushing in said end of said guide sleeve having a clearance with the work of not more than .015 of an inch.

9. The combination with a work advancing unit of an automatic screw machine including a rotary sleeve into which the work extends and a feed chuck secured to said sleeve and having spring fingers with work engaging jaws resiliently urged into engagement with the work, by said spring fingers, of a work confining guide sleeve arranged in said feed chuck supporting sleeve immediately in advance of said feed chuck and having bushings arranged at intervals therein, said bushings having a clearance with the work of not more than .015 of an inch.

10. The combination with a work advancing unit of an automatic screw machine including a rotary sleeve into which the work extends and a feed chuck secured to said sleeve and having spring fingers with work engaging jaws resiliently urged into engagement with the work, by said spring fingers, of a work confining guide sleeve arranged in said feed chuck supporting sleeve immediately in advance of said feed chuck and having an internal diameter of not more than .015 of an inch greater than the external diameter of the work, and a bushing arranged between the end of said bushing nearest to said chuck and the work gripping jaws of said chuck and also having an internal diameter not greater than .015 of an inch more than the external diameter of the work.

11. The combination with a work advancing unit of an automatic screw machine including a rotary sleeve into which the work extends and a feed chuck secured to said sleeve and having spring fingers with work engaging jaws resiliently urged into engagement with the work, by said spring fingers, of a work confining guide sleeve arranged in said feed chuck supporting sleeve in advance of said feed chuck and having an internal diameter not more than .015 of an inch greater than the outside diameter of the work and through which the work passes to said feed chuck, said feed chuck having an unslotted cylindrical portion, and a bushing arranged in said cylindrical portion of said feed chuck and having a clearance with the work of not more than .015 of an inch.

12. The combination with a work advancing unit of an automatic screw machine including a rotary sleeve into which the work extends and a feed chuck secured to said sleeve and having spring fingers with work engaging jaws resiliently urged into engagement with the work, by said spring fingers, said sleeve having a shouldered portion adjacent to said chuck, of a work confining bushing removably arranged in said rotary sleeve and held against said shouldered portion by said chuck, said bushing having an internal diameter not exceeding .015 of an inch greater than the external diameter of the work to permit said work to move lengthwise through said bushing and to confine the work against radial movement in excess of .015 of an inch.

LEIGH R. EVANS.